UNITED STATES PATENT OFFICE.

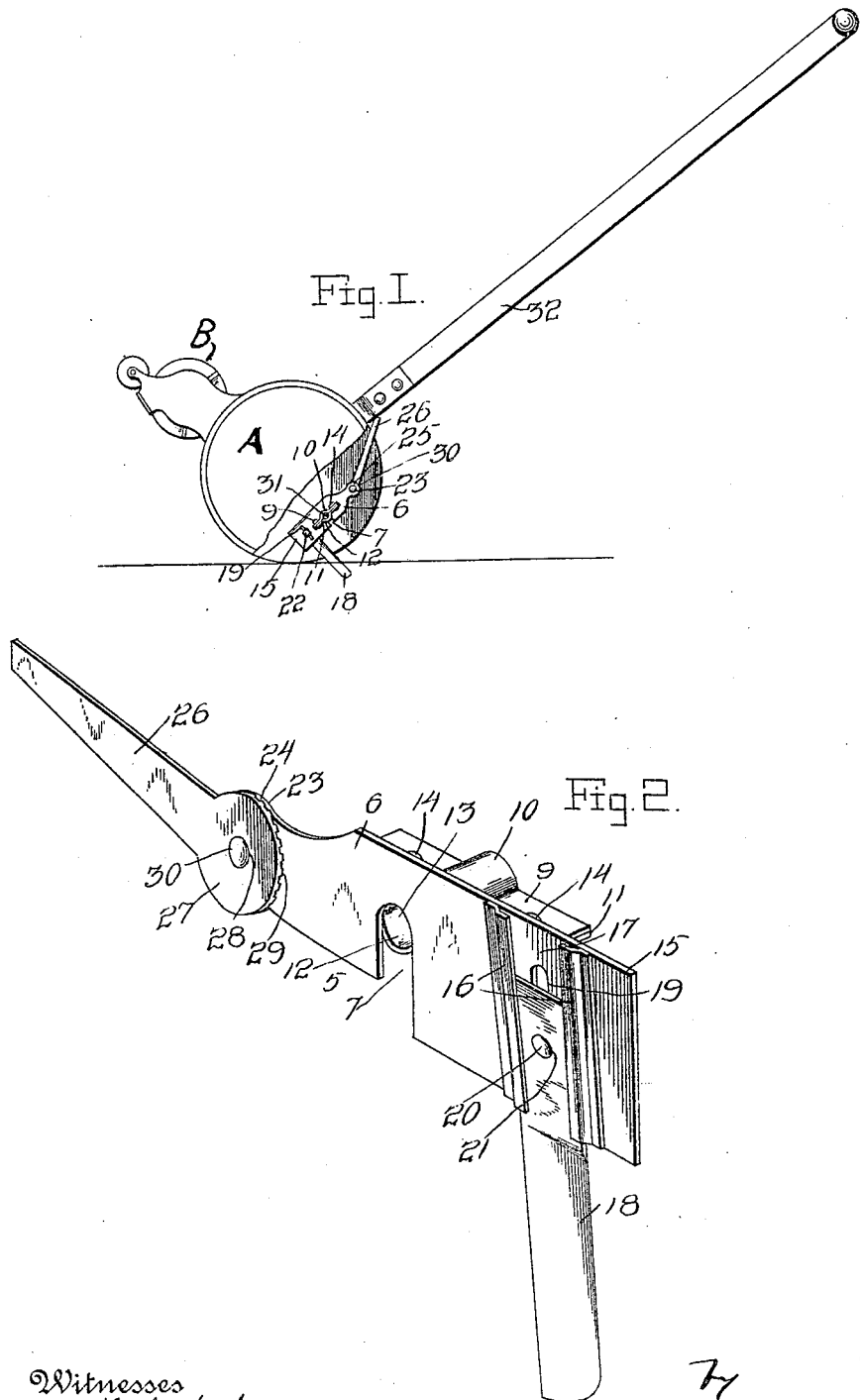

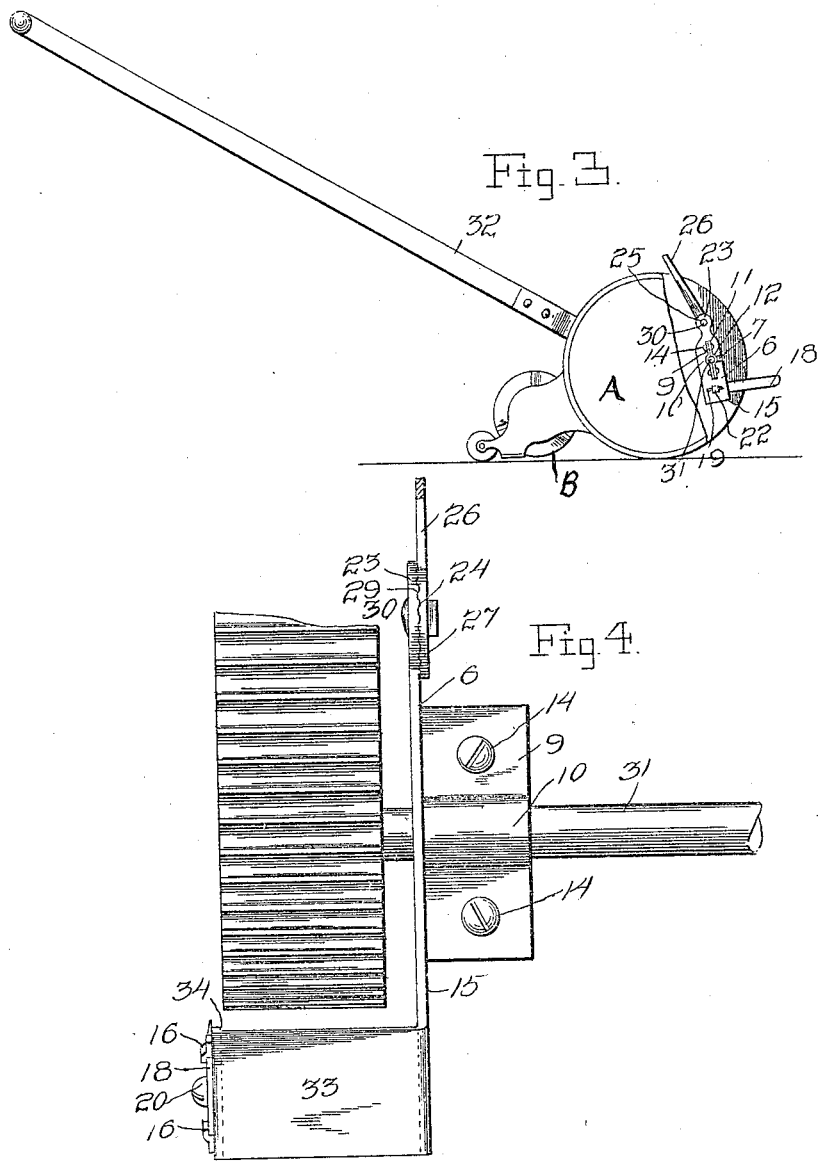

JAMES WEST, OF SEATTLE, WASHINGTON.

LAWN-MOWER ATTACHMENT.

No. 801,122.     Specification of Letters Patent.     Patented Oct. 3, 1905.

Application filed August 20, 1904. Serial No. 221,503.

*To all whom it may concern:*

Be it known that I, JAMES WEST, a citizen of the United States, residing at Seattle, in the county of King, State of Washington, have invented certain new and useful Improvements in Lawn-Mower Attachments; and I do hereby declare the following to be a full, clear, and exact description of the invention, such as will enable others skilled in the art to which it appertains to make and use the same.

This invention relates to lawn-mowers, and more particularly to attachments therefor, and has for its object to provide an attachment applicable to any lawn-mower which may be used for trimming the edges of lawns along walks or driveways or in similar places.

A further object is to provide a device of this nature which will be simple in construction and which may be manufactured at a low figure.

Other objects and advantages will be apparent from the following description, and it will be understood that modifications of the specific construction shown may be made and any suitable materials may be used without departing from the spirit of the invention.

In the drawings forming a portion of this specification, and in which like characters of reference indicate similar parts in the several views, Figure 1 is a side elevation of a lawn-mower, showing the present invention attached thereto. Fig. 2 is a perspective view of the attachment removed from the mower. Fig. 3 is a side elevation of the device attached to a mower and showing it in the position it occupies when the mower is in use. Fig. 4 is a perspective view of a modified form of the invention and illustrating a portion of a mower to which it is attached.

Referring now to the drawings, the present invention comprises a casting 5, including a flat plate 6, somewhat elongated and having a U-shaped notch 7 in one of its edges. Projecting from one face of the plate 6 and formed integral therewith is one member 8 of a clamp 9, this member being in the form of a plate which extends longitudinally of the plate 6 and which is provided with a convolution 10, the concave surface of which lies flush with the curved inner end of the notch 7. Disposed against the member 8 is the second member 11 of the clamp, which is in the form of a separate plate having a transverse convolution 12 extending in the opposite direction to the convolution 10 and coinciding therewith to form a substantially cylindrical passage 13, the two members of the clamp being held together by bolts 14.

Between the notch 7 and the forward end 15 of the plate 6 and at the opposite side of the plate from the clamp 9 the plate 6 is provided with a pair of spaced ribs 16, extending diagonally thereacross, and these ribs are inclined transversely toward each other to form a dovetail groove 17, in which there is slidably mounted a knife-blade 18. Extending longitudinally and centrally of the groove 17 there is a slot 19, formed through the plate 6, and in this slot there is slidably engaged a bolt 20, which is passed through an opening 21 in the blade 18, and this bolt is provided with a nut 22, which may be operated to clamp the blade against movement in the groove 17. As illustrated, the cutting edge of the blade 18 lies away from the notch 7. At the opposite side of the notch 7 from the blade 18 the plate 6 is provided with a circular portion 23 at its ends, having radially-extending corrugations 24 and a central perforation 25. An arm 26 is provided having a circular end portion 27, and this end portion is also provided with a central perforation 28 and radial convolutions 29, the perforations 25 and 28 being disposed in alinement with each other for the reception of a bolt 30, which may be operated to clamp the two circular portions together, the corrugations preventing movement of the two portions with respect to each other.

In use the attachment is disposed upon a lawn-mower A with the upper transverse brace-rod 31 thereof engaged in the notch 7 and in the passage 13 between the members of the clamp 9, the bolts 14 being screwed up to hold the attachment in position. The lawn-mower includes the usual cutting-blades B. The device is so disposed that the blade 18 projects upwardly and forwardly and the arm 26 is adjusted to extend upwardly and rearwardly and in the path of movement of the handle 32 of the lawn-mower upon its pivotal connection with the remainder of the implement. This arrangement of the attachment does not interfere with the use of the lawn-mower in the usual manner, and when the attachment is to be used the lawn-mower is inverted, as is usual when the implement is being transferred from place to place, the ratchet mechanism within the wheels preventing rotation of the cutting-blades B, and when this is done the handle 32 comes into engagement with the arm 26, as illustrated in Fig. 1, and the blade 18 is brought into position to cut the grass, as mentioned above. By reason of the adjustability of the arm 26 and the clamp 9 the attachment may be used in connection with different-sized lawn-mowers.

In Fig. 4 there is shown a modification in which the plate 6 is provided with a lateral extension 33, which projects beyond one of the wheels of the lawn-mower, and at the end of this extension 33 there is an extension 34, to which the blade 18 is attached in the manner already described, the blade being thus brought to a point outwardly of the wheel of the implement so that the implement may run entirely on the walk or driveway when the grass is being cut by the blade.

What is claimed is—

1. The combination with a lawn-mower including supporting-wheels, a grass-cutting blade connected with the wheels, and a brace-rod, said lawn-mower being movable to bring its grass-cutting blade into and out of operative position, of an edge-cutting blade connected with the brace-rod and disposed to lie in operative position when the grass-cutting blade is in inoperative position and to lie in inoperative position when the grass-cutting blade is in operative position.

2. The combination with a lawn-mower, of an edge-trimming attachment removably attached thereto, said attachment including a blade arranged to lie in inoperative position when the lawn-mower is in use, and to lie in operative position when the lawn-mower is inverted, and an arm arranged for engagement by the handle of the lawn-mower when the latter is inverted to hold the blade in engagement with the grass to be cut.

3. An edge-trimming attachment for lawn-mowers comprising a plate arranged for attachment to a lawn-mower, a blade adjustably connected to the plate, and an arm adjustably connected to the plate, said arm being arranged for engagement by the handle of a lawn-mower when the latter is inverted to hold the blade in operative position.

In testimony whereof I affix my signature in presence of two witnesses.

JAMES WEST.

Witnesses:
   Jos. W. Gregory,
   W. G. Behner.